US010028305B2

(12) United States Patent
Han

(10) Patent No.: US 10,028,305 B2
(45) Date of Patent: Jul. 17, 2018

(54) PAGING COLLISION RESOLUTION METHOD FOR DUAL SIM CARD TERMINAL AND A DUAL SIM CARD TERMINAL

(71) Applicant: Samsung Electronics Co., Ltd., Suwon-si (KR)

(72) Inventor: Shu Han, Hwasung (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/364,413

(22) Filed: Nov. 30, 2016

(65) Prior Publication Data
US 2018/0042054 A1 Feb. 8, 2018

(30) Foreign Application Priority Data
Aug. 5, 2016 (CN) .......................... 2016 1 0636003

(51) Int. Cl.
*H04W 68/00* (2009.01)
*H04W 72/00* (2009.01)
*H04W 74/08* (2009.01)
*H04W 68/02* (2009.01)
*H04W 72/04* (2009.01)

(52) U.S. Cl.
CPC ....... *H04W 74/0841* (2013.01); *H04W 68/02* (2013.01); *H04W 72/0446* (2013.01)

(58) Field of Classification Search
CPC ............. H04W 68/02; H04W 72/0446; H04W 74/0841

USPC ......................................................... 455/458
See application file for complete search history.

(56) References Cited

U.S. PATENT DOCUMENTS

| 2003/0100311 | A1* | 5/2003 | Chung | H04W 52/283 455/453 |
| 2007/0097926 | A1* | 5/2007 | Liu | H04L 47/10 370/335 |
| 2010/0128699 | A1* | 5/2010 | Yang | H04W 76/025 370/335 |
| 2012/0108273 | A1* | 5/2012 | Lee | H04W 68/02 455/458 |
| 2013/0150014 | A1* | 6/2013 | Gong | H04W 8/183 455/418 |
| 2013/0203426 | A1* | 8/2013 | Harnay | H04W 76/026 455/450 |
| 2013/0225123 | A1* | 8/2013 | Adjakple | H04W 4/24 455/406 |

(Continued)

*Primary Examiner* — Rafael Pérez-Gutiérrez
*Assistant Examiner* — Mark G. Pannell
(74) *Attorney, Agent, or Firm* — Muir Patent Law, PLLC

(57) ABSTRACT

Disclosed are a paging collision resolution method for a dual SIM card terminal and a dual SIM card terminal. The paging collision resolution method for the dual SIM card terminal comprises: determining whether a receiving time window of paging channel (PCH) for a first SIM card overlaps a receiving time window of PCH for a second SIM card; and when it is determined that the receiving time window of PCH for the first SIM card overlaps the receiving time window of PCH for the second SIM card, allocating receiving opportunities for PCH to the first and second SIM cards by performing random round robin strategy using a predetermined random sequence.

20 Claims, 9 Drawing Sheets

(56) References Cited

U.S. PATENT DOCUMENTS

| | | | |
|---|---|---|---|
| 2013/0316718 A1* | 11/2013 | Hsu | H04W 72/1278 455/450 |
| 2014/0274168 A1* | 9/2014 | Xia | H04W 68/005 455/458 |
| 2015/0017982 A1* | 1/2015 | Klatt | H04W 68/00 455/434 |
| 2015/0141017 A1* | 5/2015 | Krishnamoorthy | H04W 36/0066 455/437 |
| 2015/0163827 A1* | 6/2015 | Ekici | H04W 68/02 370/338 |

* cited by examiner

| conflicts count | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| first SIM card | 0 | 0 | | | 0 | | 0 | | | 0 | 0 | | 0 | | | 0 | | 0 | 0 | |
| second SIM card | | | 1 | 1 | | 1 | | 1 | 1 | | | 1 | | 1 | 1 | | 1 | | | 1 |

PAGING COLLISION RESOLUTION METHOD FOR DUAL SIM CARD TERMINAL AND A DUAL SIM CARD TERMINAL

CROSS-REFERENCE TO RELATED APPLICATION

This U.S. non-provisional patent application claims priority under 35 U.S.C. § 119 to Chinese Patent Application No. 201610636003.3, filed on Aug. 5, 2016, the contents of which are hereby incorporated herein by reference in their entirety.

FIELD OF THE INVENTION

The present disclosure relates to a paging collision resolution method for a dual subscriber identification module (SIM) card terminal, and more particularly, to a paging collision resolution method of allocating paging opportunities for paging channel (PCH) to two SIM cards in the dual SIM card terminal by performing a random round robin strategy using a predetermined random sequence.

DESCRIPTION OF THE RELATED ART

Dual SIM card terminals are widely used in daily life, which belong to a popular mobile terminal. It is found in a drive test procedure that two SIM cards in the dual SIM card terminal are in Global System for Mobile Communications (GSM) mode in many cases. In the GSM mode, calling service is typically a regular service, and it may be difficult for a user to tolerate a calling failure. For the calling failure, since the two SIM cards may reside in a same cell and belong to a same paging group, or reside in different cells while positions at which paging messages are located are overlapped or adjacent to each other, the paging messages for the two SIM cards would be lost.

Conventionally, two main solutions have been adopted to address this calling failure issue. First, when a first SIM card and a second SIM card belong to different operators and positions of paging groups of the first SIM card and the second SIM card are colliding, cell reselection is typically performed with respect to the first SIM card or the second SIM card so that the positions of paging groups are not colliding. Second, when it is detected that a paging collision occurs among the first SIM card and the second SIM card, receiving opportunities for paging messages can be allocated according to the following three strategies.

The first strategy is a First Come Higher Priority rule. When the first and second SIM cards reside in different cells, if a mobile terminal detects that a paging message for one of the first and second SIM cards is currently processed, a paging message for the other of the first and second SIM cards would be discarded. However, when a paging interval of a cell in which a SIM card of which a position of paging group is later is a multiple of a paging interval of a cell in which a SIM card of which a position of paging group is earlier, the SIM card of which the position of paging group is later would lose the receiving opportunities for paging messages. In addition, if and only if paging intervals (BS_PA_MFRMS) of two cells are coprime, the SIM card of which the position of paging group is later would lose the receiving opportunities for paging messages in a cycle which is a common multiple of the paging interval (BS_PA_MFRM).

The second strategy is a Low Frequency Higher Priority rule. When the first and second SIM cards reside in the different cells while the positions at which paging groups of the first and second SIM cards are located are overlapped or adjacent to each other, the mobile terminal would first ensure that a SIM card of which the paging interval (BS_PA_MFRM) is comparatively large obtains the receiving opportunity for paging messages, and discard the receiving opportunity for paging messages of a SIM card of which the paging interval (BS_PA_MFRM) is comparatively small, if a paging collision occurs. However, when the paging interval of a cell in which the SIM card of which the paging interval is comparatively large resides is a multiple (BS_PA_MFRM1X BS_PA_MFRM2) of the paging interval of a cell in which the SIM card of which the paging interval is comparatively small resides, the SIM card of which the paging interval (BS_PA_MFRM2) is small would lose the receiving opportunities for paging messages in a cycle which is the paging interval (BS_PA_MFRM1) being large. Also, when the paging intervals of the first and second SIM cards are coprime, the SIM card of which the paging interval is small would lose the receiving opportunities for paging messages in a cycle which is common multiple (BS_PA_MFRM1×BS_PA_MFRM2) of the paging intervals.

The third strategy is a Fundamentalism Round Robin rule. When there is a paging collision, the first and second SIM cards would obtain the receiving opportunities for paging messages alternatively. For example, if the receiving opportunity for paging messages is allocated to the first SIM card when the paging collision occurs last time, the receiving opportunity for paging messages would be allocated to the second SIM card when the paging collision occurs this time. However, in this case, the first and second SIM cards would lose the receiving opportunities for paging messages in an equal interval, thus the paging interval would be doubled. As a result, both of the first and second SIM cards would lose the receiving opportunities for paging messages periodically.

The solutions for avoiding the paging collision by the cell reselection or determining paging priorities of the first and second SIM cards according to a length of a paging cycle as described above have a technical defect, i.e., paging gain brought by secondary paging are not sufficiently utilized. In particular, periodic paging lost may be caused by determining priorities of the paging messages using the paging cycle. As a result, the SIM card of which a priority is low would lose the paging messages periodically, while there are the paging messages transmitted in an equal interval in the existing communication networks. Therefore, the paging lost may occur, which leads to a failure of establishing a calling. Alternatively, one SIM card may reside in a cell (neighboring cell) of which service is not best by avoiding the paging collision by the mandatory cell reselection, and when a signal intensity of the neighboring cell is low, quality of service of the SIM card residing in said cell may be rapidly deteriorated.

SUMMARY OF THE INVENTION

Therefore, an object of the present disclosure is to provide a paging collision resolution method which may prevent any one SIM card in a dual SIM card terminal from losing paging messages periodically, and effectively improve a call setup success rate.

According to an aspect of the present disclosure, there is provided a paging collision resolution method for a dual SIM card terminal, comprising: determining whether a receiving time window of paging channel (PCH) for a first SIM card overlaps a receiving time window of PCH for a second SIM card; and when it is determined that the receiving time window of PCH for the first SIM card overlaps the receiving time window of PCH for the second SIM card, allocating receiving opportunities for PCH to the first and second SIM cards by performing random round robin strategy using a predetermined random sequence.

According to another aspect of the present disclosure, there is provided a dual SIM card terminal, comprising: a storage, which stores a predetermined random sequence and program codes of a paging collision resolution method; and at least one processor, which is configured to read and execute the program codes stored in the storage, so as to perform the following operations: determining whether a receiving time window of paging channel (PCH) for a first SIM card overlaps a receiving time window of PCH for a second SIM card; and when it is determined that the receiving time window of PCH for the first SIM card overlaps the receiving time window of PCH for the second SIM card, allocating receiving opportunities for PCH to the first and second SIM cards by performing random round robin strategy using a predetermined random sequence.

According to another aspect of the present disclosure, there is provided a paging collision resolution method for a dual SIM card terminal comprising: determining whether a receiving time window of a paging channel (PCH) for a first SIM card overlaps a receiving time window of a PCH for a second SIM card; and when it is determined that the receiving time window of a PCH for the first SIM card overlaps the receiving time window of a PCH for the second SIM card, allocating receiving priorities for PCH to the first and second SIM cards by performing random round robin strategy using a predetermined random sequence in which when a current position of the predetermined random sequence indicates that current receiving authority belongs to the first SIM card, a request for paging receiving of the second SIM card is discarded, and when a current position of the predetermined random sequence indicates that current receiving authority belongs to the second SIM card, a request for paging receiving of the first SIM card is discarded.

According to a further aspect of the present disclosure, there is provided a non-transitory computer readable storage medium readable by a processor, said non-transitory computer readable storage medium storing programs executable by said processor to perform a paging collision resolution method for a dual SIM card terminal comprising: determining whether a receiving time window of a paging channel (PCH) for a first SIM card overlaps a receiving time window of a PCH for a second SIM card; and when it is determined that the receiving time window of a PCH for the first SIM card overlaps the receiving time window of a PCH for the second SIM card, allocating receiving priorities for PCH to the first and second SIM cards by performing random round robin strategy using a predetermined random sequence in which when a current position of the predetermined random sequence indicates that current receiving authority belongs to the first SIM card, a request for paging receiving of the second SIM card is discarded, and when a current position of the predetermined random sequence indicates that current receiving authority belongs to the second SIM card, a request for paging receiving of the first SIM card is discarded.

BRIEF DESCRIPTION OF THE DRAWINGS

These and/or other aspects and advantages of the present disclosure will become apparent and more readily appreciated from the following description of embodiments, taken in conjunction with accompanying drawings in which:

FIG. 3 is a diagram illustrating an example of a predetermined random sequence according to an embodiment of the present disclosure;

FIG. 6 is a diagram illustrating a comparison between a Fundamentalism Round Robin rule and a Low Frequency Higher Priority rule of prior art and a random round robin strategy according to an exemplary embodiment of the present disclosure;

DETAILED DESCRIPTION

Figure 1:
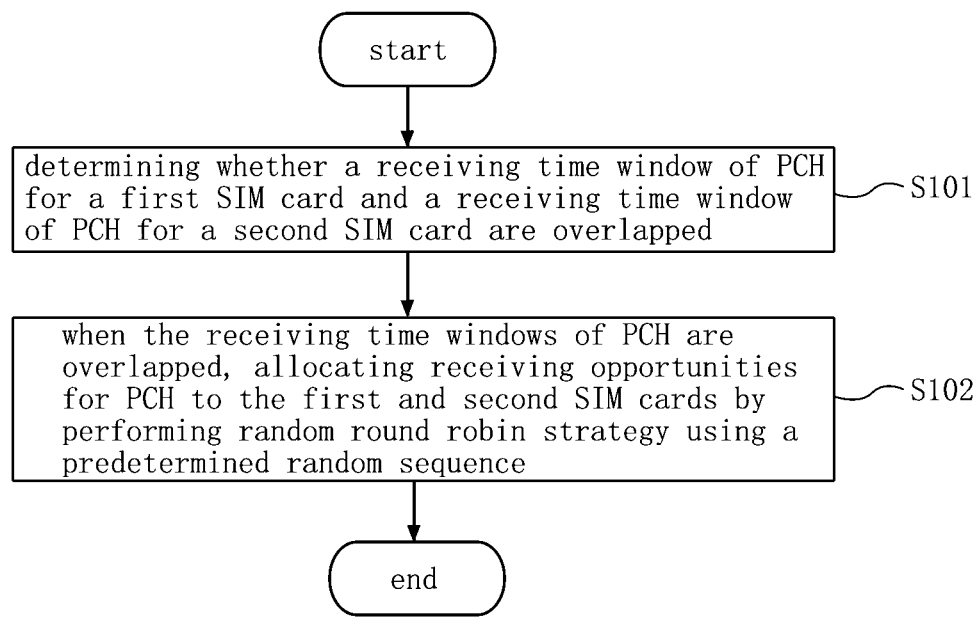
FIG. 1 is a flowchart illustrating a paging collision resolution method for a dual SIM card terminal according to an exemplary embodiment of the present disclosure.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Unless otherwise defined, all terms (including technical and scientific terms) used herein have the same meaning as commonly understood by one of ordinary skill in the art to which this disclosure belongs.

Hereinafter, the disclosure will be described in more details with reference to the drawings.

FIG. 1 is a flowchart illustrating a paging collision resolution method for a dual SIM card terminal according to an exemplary embodiment of the present disclosure.

Referring to FIG. 1, in step S101, it is determined whether a receiving time window of paging channel (PCH) for a first SIM card and a receiving time window of PCH for a second SIM card are overlapped. When the receiving time window of PCH for the first SIM card and the receiving time window of PCH for the second SIM card are overlapped, in step S102, receiving opportunities for PCH are allocated to the first and second SIM cards by performing random round robin strategy, which will be described later, using a predetermined random sequence. According to example embodiments of the present disclosure, the paging collision resolution method can be performed by a dedicated processor or a general-purpose processor (for example, a CPU) in the dual SIM card terminal. Hereinafter, the paging collision resolution method for the dual SIM card terminal according to the exemplary embodiment of the present disclosure will be described in detail with reference to FIG. 2.

Figure 2:
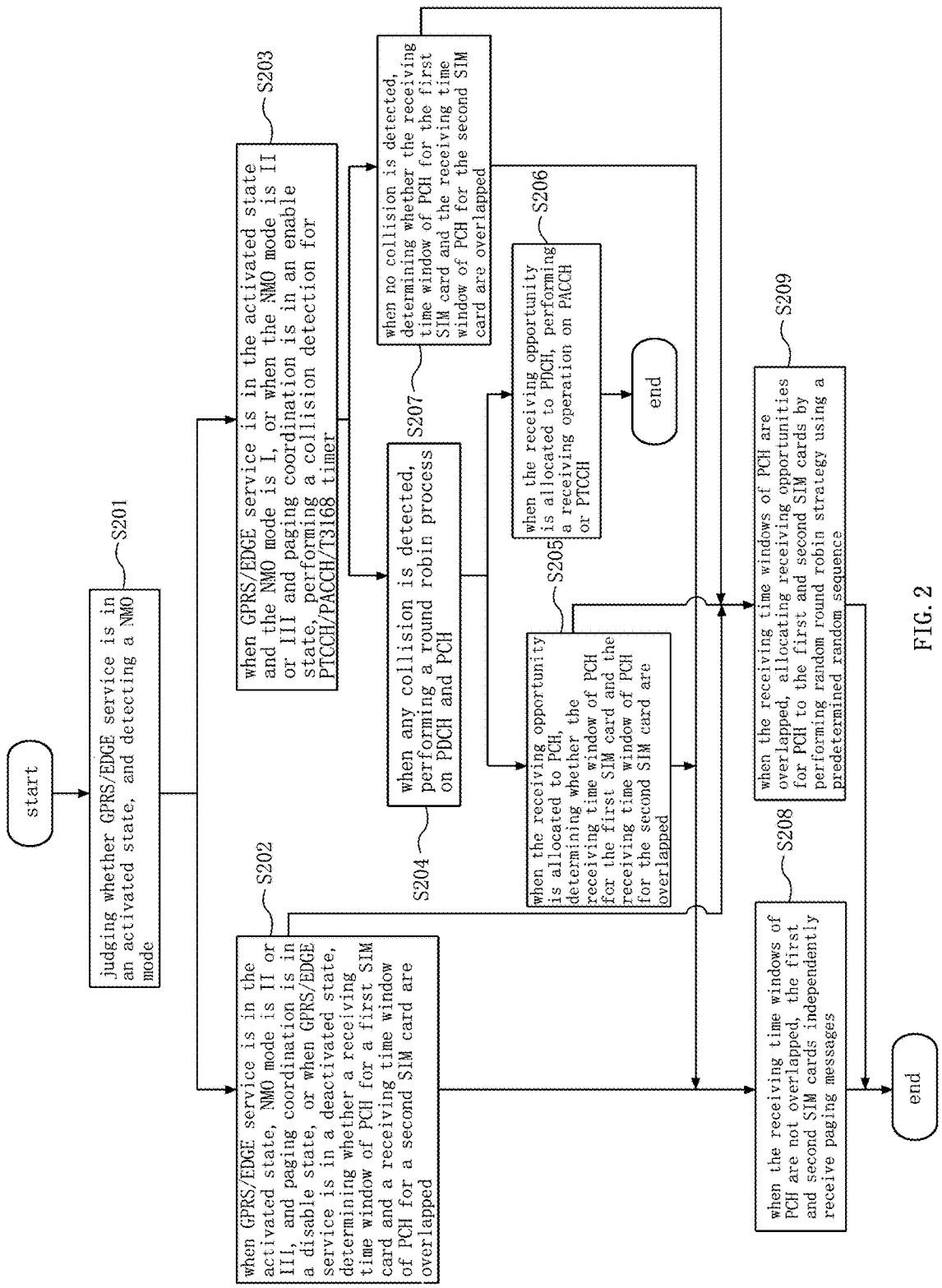
FIG. 2 is a detailed flowchart illustrating a paging collision resolution method for a dual SIM card terminal according to an exemplary embodiment of the present disclosure.

FIG. 2 is a detailed flowchart illustrating a paging collision resolution method for a dual SIM card terminal according to an exemplary embodiment of the present disclosure.

Referring to FIG. 2, in step S201, it is judged whether current GPRS/EDGE (General Packet Radio Service/Enhanced Data Rate for GSM Evolution) service is in an activated state, and a Network Mode of Operation (NMO mode) of a GPRS/EDGE network is detected. A GPRS may refer to a packet-based wireless communication service that may allow data rates from 9 Kbps up to 170 Kbps and continuous connection to the Internet for mobile phone and computer users. An EDGE may refer to a packet-based wireless communication service that may allow data rates from 9 Kbps up to 480 Kbps and continuous connection to the Internet for mobile device (e.g., mobile phone) and computer users. In general, during an ongoing GPRS/EDGE data transfer, mobile devices may not detect incoming voice calls and SMS (Short Message Service) messages, e.g., paging messages, as they are focused on receiving packets and thus may not observe the paging channel PCH. In NMO mode, the circuit switch (CS) part of the network forwards the paging message to the packet switch (PS) side of the network which then forwards the paging message between user data blocks while a data transfer is ongoing. Mobile device can thus receive the paging message despite the ongoing data transfer, interrupt the session and accept the voice call or SMS.

In step S202, when the GPRS/EDGE service is in the activated state, the Network Mode of Operation is NMO II or NMO III, and paging coordination is in a disable state, or when the GPRS/EDGE service is in a deactivated state, it is determined whether a receiving time window of PCH for a first SIM card and a receiving time window of PCH for a second SIM card are overlapped.

Generally, in an NMO I mode, CS and PS paging is coordinated on either the GPRS or the GSM paging channel. If the mobile device has been assigned a data traffic channel, then CS paging will take place over this data channel rather than the paging channel (CS or PS). In an NMO II mode, paging for CS and PS devices will be transferred over GSM common control channel (CCCH) paging channel. Even if the mobile phone has been assigned a packet data channel, CS paging will continue to take place over the CCCH paging channel and thus monitoring of this channel may still be required. In NMO III mode, CS paging will be transferred over the CCCH paging channel. PS paging will be transferred over the packet CCCH (PCCCH) paging channel, if it exists in the cell. In this case the mobile device needs to monitor both the paging channels.

According to an embodiment of the present disclosure, the receiving time window of PCH for the first SIM card and the receiving time window of PCH for the second SIM card can be determined in advance in the dual SIM card terminal. In particular, positions of paging groups corresponding to the first SIM card and positions of paging groups corresponding to the second SIM card can be calculated based on BS_PA_MFRM and BS_AG_BLK parameters obtained from Broadcast Control Channel (BCCH) and International Mobile Subscriber Identity (IMSI) numbers, so that the receiving time window of PCH for the first SIM card and the receiving time window of PCH for the second SIM card can be determined.

On the other hand, in step S203, when the GPRS/EDGE service is in the activated state and the Network Mode of Operation is NMO I, or when the GPRS/EDGE service is in the activated state, the Network Mode of Operation is NMO II or NMO III, and paging coordination is in an enable state, a collision detection for Packet Timing Control Channel (PTCCH)/Packet Associated Control Channel (PACCH)/T3168 timer is performed.

In step S204, when any collision is detected, a round robin process is performed on Packet Data Channel (PDCH) and PCH. In the round robin process, resources are allocated according to an object obtaining an opportunity last time when the collision occurs. For example, if a receiving opportunity is allocated to PCH last time when the collision occurs, the current receiving opportunity is allocated to PDCH (including PACCH and PTCCH), while if the receiving opportunity is allocated to PDCH last time when the collision occurs, the current receiving opportunity is allocated to PCH.

In step S205, when the receiving opportunity is allocated to PCH through the round robin process, it is determined whether the receiving time window of PCH for the first SIM card and the receiving time window of PCH for the second SIM card are overlapped.

Alternatively, in step S206, when the receiving opportunity is allocated to PDCH through the round robin process, a receiving operation is performed on PACCH or PTCCH. In this case, the paging collision resolution method for the dual SIM card terminal according to the embodiment of the present disclosure is ended.

In addition, in step S207, when no collision is detected, it is determined whether the receiving time window of PCH for the first SIM card and the receiving time window of PCH for the second SIM card are overlapped.

In step S208, when the receiving time window of PCH for the first SIM card and the receiving time window of PCH for the second SIM card are not overlapped, the first and second SIM cards independently receive paging messages. In particular, a PCH signal transmits two kinds of paging frames:

an empty paging frame and a paging frame with PAGE_IND (paging indicator) message. If one of the first and second SIM cards receives the paging frame with PAGE_IND message, the SIM card starts a CS (circuit switch) call setup procedure, and the other SIM card terminates PCH listening. However, if both of the first and second SIM cards receive the empty paging frame, they will continue to perform PCH listening at a position of the next paging group respectively.

In step S209, when the receiving time window of PCH for the first SIM card and the receiving time window of PCH for the second SIM card are overlapped, receiving opportunities (e.g., receiving priorities) for PCH are allocated to the first and second SIM cards by performing random round robin strategy using a predetermined random sequence. In particular, when a current position of the predetermined random sequence indicates that current receiving authority belongs to the first SIM card, a request for paging receiving of the second SIM card would be discarded, and when a current position of the predetermined random sequence indicates that current receiving authority belongs to the second SIM card, a request for paging receiving of the first SIM card would be discarded. Meanwhile, a next position of the predetermined random sequence is updated as the current position of the predetermined random sequence. Then, the paging collision resolution method is re-performed in a next paging cycle. Herein, when the paging frame with PAGE_IND message is received, the SIM card to which a receiving opportunity for PCH is allocated starts the CS call setup procedure, while the SIM card to which the receiving opportunity for PCH is not allocated terminates PCH listening. However, if the SIM card to which a receiving opportunity for PCH is allocated receives the empty paging frame, the receiving opportunities for PCH are allocated to the first and second SIM cards by performing the random round robin strategy using the predetermined random sequence again at the position of the next paging group (in a case where the paging collision occurs). Specific operations of performing the random round robin strategy using the predetermined random sequence and specific configuration of the predetermined random sequence will be described later in detail.

FIG. 3 is a diagram illustrating an example of a predetermined random sequence according to an exemplary embodiment of the present disclosure.

Referring to FIG. 3, according to the predetermined random sequence, paging opportunities are allocated to a first SIM card when the first and second paging collisions occur, paging opportunities are allocated to a second SIM card when the third and fourth paging collisions occur, a paging opportunity is allocated to the first SIM card when the fifth paging collision occurs, a paging opportunity is allocated to the second SIM card when the sixth paging collision occurs, and so on. However, the disclosure is not limited to the random sequence mentioned herein.

As shown in FIG. 3, according to the exemplary predetermined random sequence, not more than twice paging opportunities are continuously allocated to a same SIM card. For example, according to multiple paging characteristic of a mobile communication operator, times of paging opportunities which are not continuously allocated in the predetermined random sequence can be re-configured. For example, if times of paging messages which are continuously transmitted by the mobile communication operator is N, not more than N−1 paging opportunities are continuously allocated to a same SIM card in the predetermined random sequence. In addition, in order to avoid losing paging message periodically since there is a multiple relationship between a cycle of the predetermined random sequence and a transmission cycle of paging messages, the paging opportunities allocated to a same SIM card in the predetermined random sequence do not have periodicity. Meanwhile, the number of the paging opportunities allocated to the first SIM card is equal to the number of the paging opportunities allocated to the second SIM card in the predetermined random sequence, in order to avoid that allocation of the paging opportunities is unbalanced under normal circumstances. However, when one of the first and second SIM cards in the dual SIM card terminal is selected as a preferred SIM card, a ratio between the paging opportunities allocated to the first SIM card and those allocated to the second SIM card in the predetermined random sequence can be dynamically adjusted. For example, if the first SIM card is selected as the preferred SIM card, the ratio between the paging opportunities allocated to the first SIM card and those allocated to the second SIM card in the predetermined random sequence can be adjusted as 6:4. Also, the ratio between the paging opportunities allocated to the first SIM card and those allocated to the second SIM card in the predetermined random sequence can be dynamically adjusted according to called frequencies of the first and second SIM cards. For example, if a ratio between the called frequencies of the first and second SIM cards is 4:6, the ratio between the paging opportunities allocated to the first SIM card and those allocated to the second SIM card in the predetermined random sequence can be adjusted as 4:6. Alternatively, the ratio between the paging opportunities allocated to the first SIM card and those allocated to the second SIM card in the predetermined random sequence can be dynamically adjusted according to paging patterns of different mobile communication operators. For example, if the transmission cycle of paging messages of the mobile communication operator corresponding to the first SIM card is smaller than that of the mobile communication operator corresponding to the second SIM card, the ratio between the paging opportunities allocated to the first SIM card and those allocated to the second SIM card in the predetermined random sequence can be adjusted as 6:4. In this case, chip manufacturers of SIM cards may know configurations of the paging patterns of all the mobile communication operators which obtain network access licenses through a large-scale drive test before the SIM cards access a network, and establish a corresponding database according to the configurations of the paging patterns of the mobile communication operators. As such, when a SIM card is mounted to a terminal, a processor of the terminal may obtain a proper paging pattern from the database, so as to dynamically adjust the predetermined random sequence.

A length of the predetermined random sequence as illustrated in FIG. 3 is 20. However, the disclosure is not limited thereto. The length L of the predetermined random sequence is determined according to the following equation:

$$L=[\text{time length of call paging}/(BS\_PA\_MFRMS*\text{transmission time of multi-frames})]+X,$$

in which X is a positive integer.

For example, a time length of call paging (a time difference between a time when a paging request is sent and a time when a paging response is received) set by the mobile communication operator is usually smaller than 12 s, and when BS_PA_MFRMS of a cell in which the first and second SIM cards reside is set as a minimum value of 2, and transmission time of 51 multiframes is about 235 ms, if a paging collision occurs, the entire predetermined random sequence is traversed by [12 s/470 ms]=25. Meanwhile, X may be set as 5. As such, the length of the predetermined random sequence may be 30.

Alternatively, the predetermined random sequence can be circularly used. For example, when number of paging collisions reaches L+1, a paging opportunity is allocated to the first and second SIM cards by using the first position of the predetermined random sequence. For example, referring to FIG. 3, when times of paging collisions reaches 21 (where L=20), a paging opportunity is allocated to the first and second SIM cards by using the first position of the predetermined random sequence. Thus, according to the predetermined random sequence, the paging opportunity is allocated to the first SIM card when the 21st collision occurs.

Figure 4A:
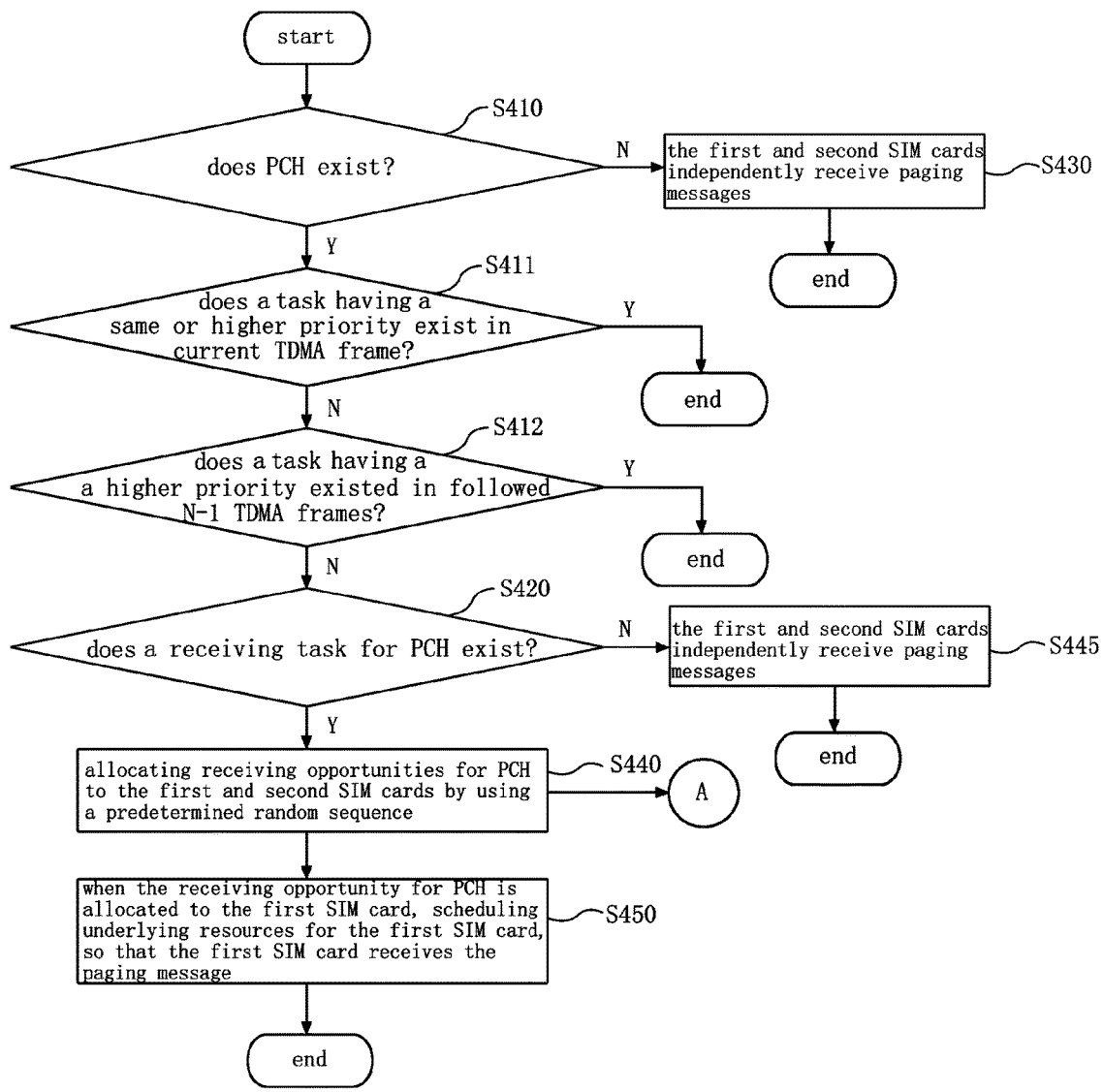
FIGS. 4A and 4B are flowcharts illustrating a process of performing a random round robin strategy by using a predetermined random sequence according to an exemplary embodiment of the present disclosure.
Figure 4B:
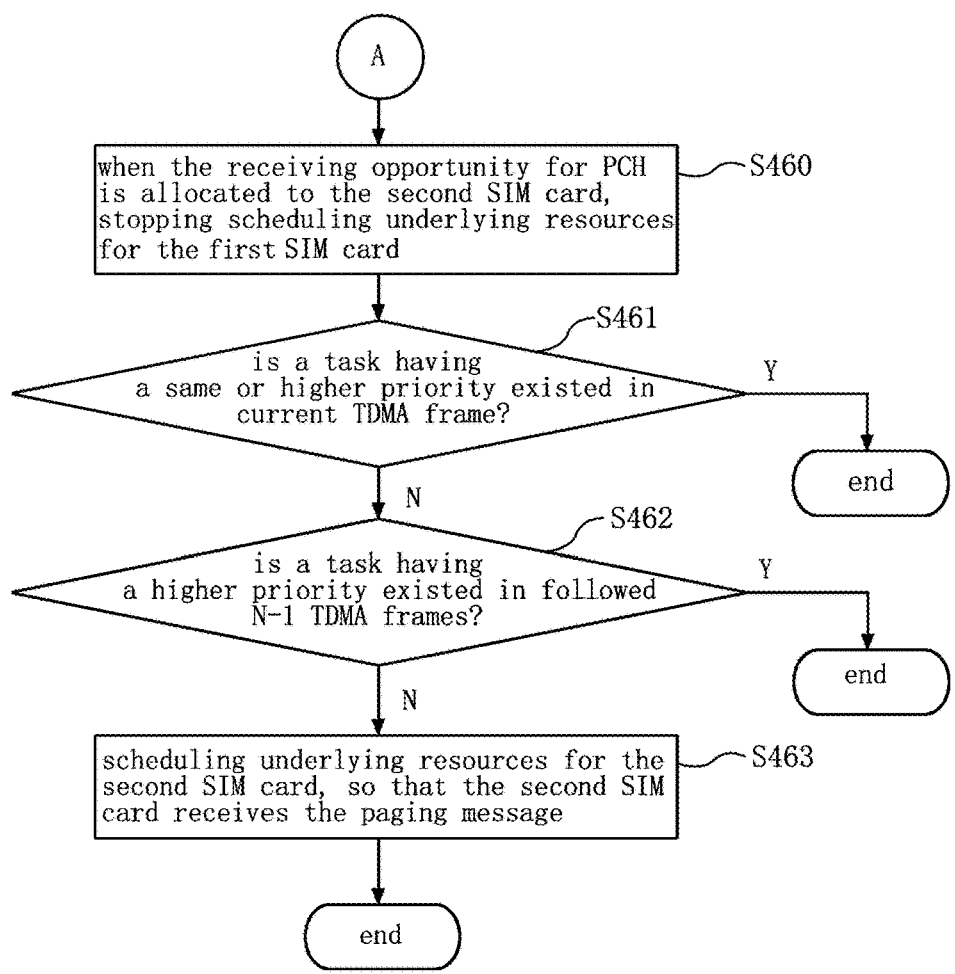

FIGS. 4A and 4B are flowcharts illustrating a process of performing a random round robin strategy by using a predetermined random sequence according to an exemplary embodiment of the present disclosure.

Referring to FIGS. 4A and 4B, in step S410, it is checked whether a first SIM card and a second SIM card have PCH in a current multiframe based on a current multiframe number. According to the embodiment of the present disclosure, 51 multiframes can be used. Thus, in step S410, it is checked whether the first and second SIM cards have PCH in the current multiframe based on a current 51 multiframe number. Herein, if the first and second SIM cards have PCH in the current multiframe, a flag bit RRR_Required is set as Enable, and if one of the first and second SIM cards does not have PCH in the current multiframe, the flag bit RRR_Required is set as Disable.

When the flag bit RRR_Required is Enable (i.e., the first and second SIM cards have PCH in the current multiframe), in step S420, it is checked whether the first and second SIM cards have a receiving task for PCH in a current TDMA frame and followed N−1 TDMA frames. Here, N TDMA frames form one receiving cycle for PCH. However, when the flag bit RRR_Required is Disable, in step S430, the first and second SIM cards may independently receive paging messages, and then this random round robin strategy is ended. In particular, when the first SIM card does not have PCH in the current multiframe, the second SIM card may independently receive paging messages; when the second SIM card does not have PCH in the current multiframe, the first SIM card may independently receive paging messages.

Alternatively, the following steps can be performed prior to step S420. For example, in step S411, it is checked whether a task of which a priority is same as or higher than a priority of the receiving task for PCH is exists in the current TDMA frame based on a current TDMA frame number with respect to the first SIM card. If the task of which the priority is higher than the priority of the receiving task for PCH exists in the current TDMA frame, or the task of which the priority is same as the priority of the receiving task for PCH and which has been in a scheduled state exists in the current TDMA frame, the receiving task for PCH is ignored, and then this random round robin strategy is ended. If the task of which the priority is same as or higher than the priority of the receiving task for PCH does not exist in the current TDMA frame, in step S412, it is checked whether a task of which the priority is higher than the priority of the receiving task for PCH exists in followed N−1 TDMA frames based on the current TDMA frame number with respect to the first SIM card. If the task of which the priority is higher than the priority of the receiving task for PCH exists in the followed N−1 TDMA frames, the receiving task for PCH is ignored, and then this random round robin strategy is ended. If the task of which the priority is higher than the priority of the receiving task for PCH does not exist in the followed N−1 TDMA frames, the method proceeds to step S420. Here, as described above, N TDMA frames form one receiving cycle for PCH. According to an alternative embodiment of the present disclosure, steps S411 and S412 can also be performed after step S420.

When the first and second SIM cards have the receiving task for PCH in the current TDMA frame or the followed N−1 TDMA frames, in step S440, receiving opportunities for PCH are allocated to the first SIM card or the second SIM card by using the predetermined random sequence. In particular, if a current position of the predetermined random sequence indicates that this receiving authority belongs to the first SIM card, a paging request of the second SIM card would be discarded. If the current position of the predetermined random sequence indicates that this receiving authority belongs to the second SIM card, a paging request of the first SIM card would be discarded. Then, a next position of the predetermined random sequence is updated as the current position.

However, when the first SIM card or the second SIM card does not have the receiving task for PCH in the current TDMA frame or the followed N−1 TDMA frames, in step S445, the first and second SIM cards can independently receive paging messages, and then the random round robin strategy is ended. In particular, when the first SIM card does not have the receiving task for PCH in the current TDMA frame or the followed N−1 TDMA frames, the second SIM card can independently receive paging messages, and when the second SIM card does not have the receiving task for PCH in the current TDMA frame or the followed N−1 TDMA frames, the first SIM card can independently receive paging messages.

When the receiving opportunity for PCH is allocated to the first SIM card by using the predetermined random sequence, in step S450, in a TDMA frame which is located at a position of paging group in the current multiframe, underlying resources (e.g. Dsl1rc_config/dsl1rc_process function) are scheduled for the first SIM card, so that the first SIM card receives the paging message. Then, this random round robin strategy is ended. However, when the receiving opportunity for PCH is allocated to the second SIM card by using the predetermined random sequence, in step S460, scheduling of the underlying resources is stopped for the first SIM card. Then, in step S461, it is checked whether a task of which a priority is same as or higher than the priority of the receiving task for PCH exists in the current TDMA frame based on the current TDMA frame number with respect to the second SIM card. If the task of which the priority is higher than the priority of the receiving task for PCH exists in the current TDMA frame, or the task of which the priority is same as the priority of the receiving task for PCH and which has been in a scheduled state exists in the current TDMA frame, the receiving task for PCH is ignored, and then this random round robin strategy is ended. If the task of which the priority is same as or higher than the priority of the receiving task for PCH does not exist in the current TDMA frame, in step S462, it is checked whether a task of which the priority is higher than the priority of the receiving task for PCH exists in the followed N−1 TDMA frames based on the current TDMA frame number with respect to the second SIM card. If the task of which the priority is higher than the priority of the receiving task for PCH exists in the followed N−1 TDMA frames, the receiving task for PCH is ignored, and then the random round robin strategy is ended. If the task of which the priority is higher than the priority of the receiving task for PCH does not exist in the followed N–1 TDMA frames, in step S463, in the TDMA frame which is located at the position of paging group in the current multiframe, the underlying resources are scheduled for the second SIM card, so that the second SIM card receives the paging message. Then, this random round robin strategy is ended.

In the above description referring to FIGS. 4A and 4B, the first SIM card is scheduled at first, and then the second SIM card is scheduled. However, the present disclosure is not limited thereto, the second SIM card can be scheduled at first, and then the first SIM card is scheduled. According to the embodiment of the present disclosure, when the second SIM card is scheduled at first, it is only needed to change the description about the first SIM card in FIGS. 4A and 4B as the description about the second SIM card, and change the description about the second SIM card in FIGS. 4A and 4B as the description about the first SIM card, so that the random round robin strategy can be performed in a same way. It can be determined whether the first SIM card or the second SIM card is scheduled at first according to a position of PCH in the current multiframe. In particular, if a position of PCH in the current multiframe with respect to the first SIM card is earlier than a position of PCH in the current multiframe with respect to the second SIM card, the first SIM card is scheduled at first, and then the second SIM card is scheduled. However, if the position of PCH in the current multiframe with respect to the first SIM card is later than the position of PCH in the current multiframe with respect to the second SIM card, the second SIM card is scheduled at first, and then the first SIM card is scheduled. For example, the position of PCH in the current multiframe can be determined in step S410, and then the scheduling of the first and second SIM cards is started.

Figure 5:
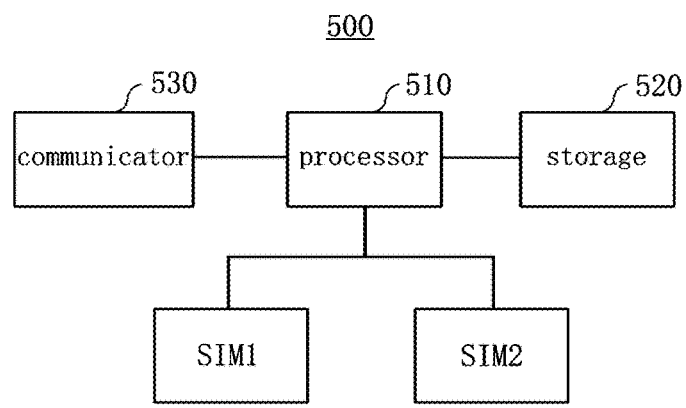
FIG. 5 is a block diagram illustrating a dual SIM card terminal according to an exemplary embodiment of the present disclosure.

FIG. 5 is a block diagram illustrating a dual SIM card terminal according to an exemplary embodiment of the present disclosure.

Referring to FIG. 5, the dual SIM card terminal 500 may include at least one processor 510 (e.g., a CPU), a storage 520, a communicator 530, a first SIM card and a second SIM card. According to an exemplary embodiment, the storage 520 may be a non-transitory computer-readable storage medium which may include a memory element such as a RAM (Random Access Memory) and may serve also as a work memory of the at least one processor 510.

Referring to FIG. 5, the at least one processor 510 can perform a paging collision resolution method according to an embodiment of the present disclosure, the storage 520 can store a predetermined random sequence and program codes of the paging collision resolution method, and the communicator 530 can perform a wireless communication function.

In particular, the at least one processor 510 may read and execute the program codes from the storage 520, so as to perform the paging collision resolution method according to the embodiment of the present disclosure. For example, the at least one processor 510 may judge whether current GPRS/EDGE service is in an activated state, and detect a Network Mode of Operation (NMO mode) of a GPRS/EDGE network. When the GPRS/EDGE service is in the activated state, the Network Mode of Operation is NMO II or NMO III, and paging coordination is in a disable state, or when the GPRS/EDGE service is in a deactivated state, the at least one processor 510 may determine whether a receiving time window of PCH for a first SIM card and a receiving time window of PCH for a second SIM card are overlapped. As described above, the at least one processor 510 may calculate positions of paging groups corresponding to the first SIM card and positions of paging groups corresponding to the second SIM card based on BS_PA_MFRM and BS_AG_BLK parameters obtained from BCCH and IMSI numbers, so as to determine the receiving time window of PCH for the first SIM card and the receiving time window of PCH for the second SIM card. When the GPRS/EDGE service is in the activated state, and the Network Mode of Operation is NMO I, or when the Network Mode of Operation is NMO II or NMO III, and paging coordination is in an enable state, the at least one processor 510 may perform a collision detection for PTCCH/PACCH/T3168 timer. When any collision is detected, the at least one processor 510 may perform a round robin process on PDCH and PCH. For example, if a receiving opportunity is allocated to PCH last time when the collision occurs, the at least one processor 510 may allocate the current receiving opportunity to PDCH (including PACCH and PTCCH), while if the receiving opportunity is allocated to PDCH last time when the collision occurs, the at least one processor 510 may allocate the current receiving opportunity to PCH. When the receiving opportunity is allocated to PCH through the round robin process, the at least one processor 510 may determine whether the receiving time window of PCH for the first SIM card and the receiving time window of PCH for the second SIM card are overlapped. When the receiving opportunity is allocated to PDCH through the round robin process, the at least one processor 510 may perform a receiving operation on PACCH or PTCCH. Then, the at least one processor 510 may end the paging collision resolution method. In addition, when no collision is detected, the at least one processor 510 may determine whether the receiving time window of PCH for the first SIM card and the receiving time window of PCH for the second SIM card are overlapped.

When the receiving time window of PCH for the first SIM card and the receiving time window of PCH for the second SIM card are not overlapped, the at least one processor 510 may control the first and second SIM cards to independently receive paging messages. When the receiving time window of PCH for the first SIM card and the receiving time window of PCH for the second SIM card are overlapped, the at least one processor 510 may allocate receiving opportunities for PCH to the first and second SIM cards by performing random round robin strategy using the predetermined random sequence. In particular, when a current position of the predetermined random sequence indicates that current receiving authority belongs to the first SIM card, the at least one processor 510 may control a request for paging receiving of the second SIM card to be discarded, and when a current position of the predetermined random sequence indicates that current receiving authority belongs to the second SIM card, the at least one processor 510 may control a request for paging receiving of the first SIM card to be discarded. Meanwhile, the at least one processor 510 may update a next position of the predetermined random sequence as the current position, and then re-perform the paging collision resolution method in a next paging cycle.

The at least one processor 510 may perform the random round robin strategy as follows, so as to perform the paging collision resolution method according to the embodiment of the present disclosure. At first, the at least one processor 510 may check whether the first and second SIM cards have PCH in the current multiframe based on a current 51 multiframe number. Herein, if the first and second SIM cards have PCH in the current multiframe, the at least one processor 510 may set a flag bit RRR_Required as Enable, and if one of the first and second SIM cards does not have PCH in the current multiframe, the at least one processor 510 may set the flag bit RRR_Required as Disable. When the flag bit RRR_Required is Enable (i.e. the first and second SIM cards have PCH in the current multiframe), the at least one processor 510 may check whether the first and second SIM cards have a receiving task for PCH in a current TDMA frame and followed N−1 TDMA frames. Here, N TDMA frames form one receiving cycle for PCH. However, when the flag bit RRR_Required is Disable, the at least one processor 510 may control the first and second SIM cards to independently receive paging messages, and then the at least one processor 510 may end this random round robin strategy.

Alternatively, before checking whether the first and second SIM cards have PCH in the current multiframe, the at least one processor 510 may check whether a task of which a priority is same as or higher than a priority of the receiving task for PCH exists in the current TDMA frame based on a current TDMA frame number with respect to the first SIM card. If the task of which the priority is higher than the priority of the receiving task for PCH exists in the current TDMA frame, or the task of which the priority is same as the priority of the receiving task for PCH and which has been in a scheduled state exists in the current TDMA frame, the at least one processor 510 may ignore the receiving task for PCH, and then end this random round robin strategy. If the task of which the priority is same as or higher than the priority of the receiving task for PCH does not exist in the current TDMA frame, the at least one processor 510 may check whether a task of which the priority is higher than the priority of the receiving task for PCH exists in followed N−1 TDMA frames based on the current TDMA frame number with respect to the first SIM card. If the task of which the priority is higher than the priority of the receiving task for PCH exists in the followed N−1 TDMA frames, the at least one processor 510 may ignore the receiving task for PCH, and then end this random round robin strategy is ended. If the task of which the priority is higher than the priority of the receiving task for PCH does not exist in the followed N−1 TDMA frames, the at least one processor 510 may check whether the first and second SIM cards have PCH in the current multiframe.

When the first and second SIM cards have the receiving task for PCH in the current TDMA frame or the followed N−1 TDMA frames, the at least one processor 510 may allocate the receiving opportunities for PCH to the first SIM card or the second SIM card by using the predetermined random sequence. In particular, if a current position of the predetermined random sequence indicates that this receiving authority belongs to the first SIM card, the at least one processor 510 may control to discard a paging request of the second SIM card. If the current position of the predetermined random sequence indicates that this receiving authority belongs to the second SIM card, the at least one processor 510 may control to discard a paging request of the first SIM card. Then, the at least one processor 510 may update the next position of the predetermined random sequence as the current position.

However, when the first SIM card or the second SIM card does not have the receiving task for PCH in the current TDMA frame or the followed N−1 TDMA frames, the at least one processor 510 may control the first and second SIM cards to independently receive paging messages, and then end the random round robin strategy.

When the receiving opportunity for PCH is allocated to the first SIM card by using the predetermined random sequence, the at least one processor 510 may schedule underlying resources for the first SIM card in a TDMA frame which is located at a position of paging group in the current multiframe, so that the first SIM card receives the paging message. Then, the at least one processor 510 may end this random round robin strategy. However, when the receiving opportunity for PCH is allocated to the second SIM card by using the predetermined random sequence, the at least one processor 510 may stop scheduling of underlying resources. Then, the at least one processor 510 may check whether a task of which a priority is same as or higher than the priority of the receiving task for PCH exists in the current TDMA frame based on the current TDMA frame number with respect to the second SIM card. If the task of which the priority is higher than the priority of the receiving task for PCH exists in the current TDMA frame, or the task of which the priority is same as the priority of the receiving task for PCH and which has been in a scheduled state exists in the current TDMA frame, the at least one processor 510 may ignore the receiving task for PCH, and then end this random round robin strategy. If the task of which the priority is same as or higher than the priority of the receiving task for PCH does not exist in the current TDMA frame, the at least one processor 510 may check whether a task of which the priority is higher than the priority of the receiving task for PCH exists in the followed N−1 TDMA frames based on the current TDMA frame number with respect to the second SIM card. If the task of which the priority is higher than the priority of the receiving task for PCH exists in the followed N−1 TDMA frames, the at least one processor 510 may ignore the receiving task for PCH, and then end the random round robin strategy. If the task of which the priority is higher than the priority of the receiving task for PCH does not exist in the followed N−1 TDMA frames, the at least one processor 510 may schedule the underlying resources for the second SIM card in the TDMA frame which is located at the position of paging group in the current multiframe, so that the second SIM card receives the paging message. Then, the at least one processor 510 may end this random round robin strategy.

Figure 6A:
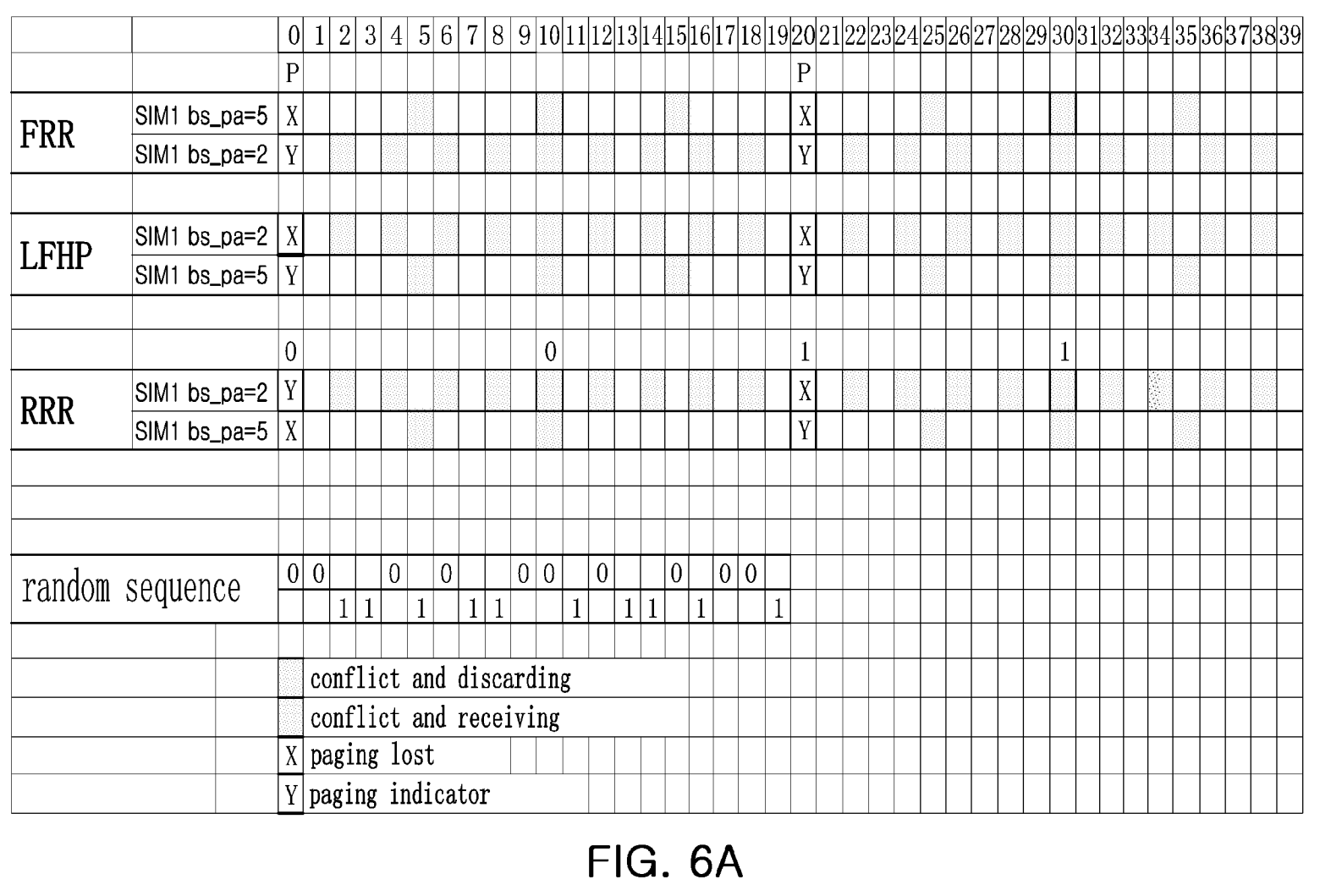
Figure 6B:
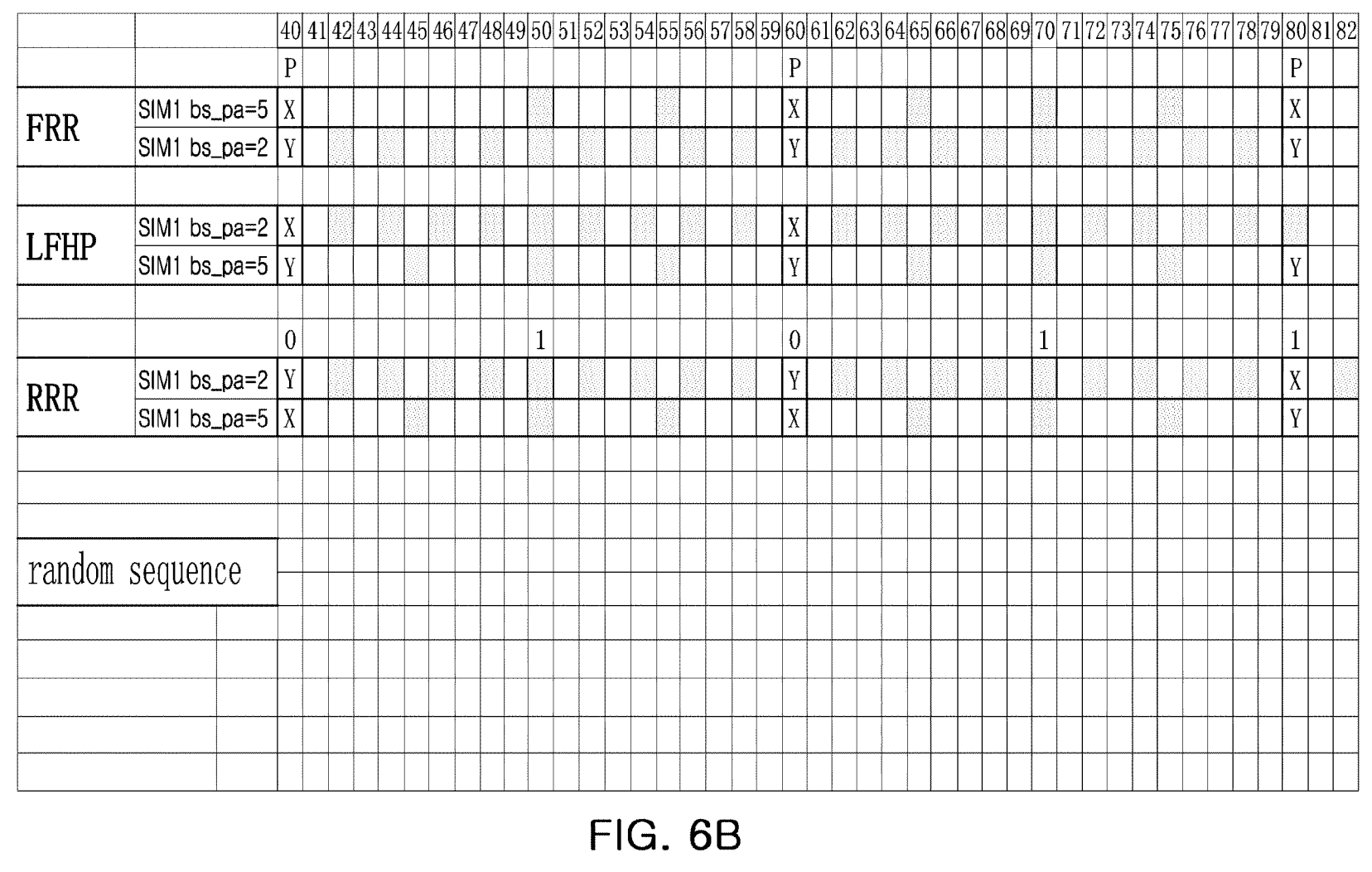

FIG. 6 is a diagram illustrating a comparison between a Fundamentalism Round Robin rule and a Low Frequency Higher Priority rule of prior art and a random round robin strategy according to an exemplary embodiment of the present disclosure.

Referring to FIG. 6. For the Fundamentalism Round Robin (FRR) rule, a first SIM card (SIM1) always loses receiving opportunities for paging messages at the moment of transmitting the paging messages by a network side, which leads to a failure of establishing a calling. For the Low Frequency Higher Priority (LFHP) rule, it is assumed that a position of paging group for a second SIM card (SIM2) is a little earlier than that for SIM1, SIM1 always loses the receiving opportunities for paging messages at the moment of transmitting the paging messages by the network side, which leads to a failure of establishing a calling. For the random round robin strategy (RRR), both SIM1 and SIM2 can obtain the receiving opportunities for paging messages in four paging processes. Thus, SIM1 and SIM2 have opportunities for establishing a call.

Figure 7A:
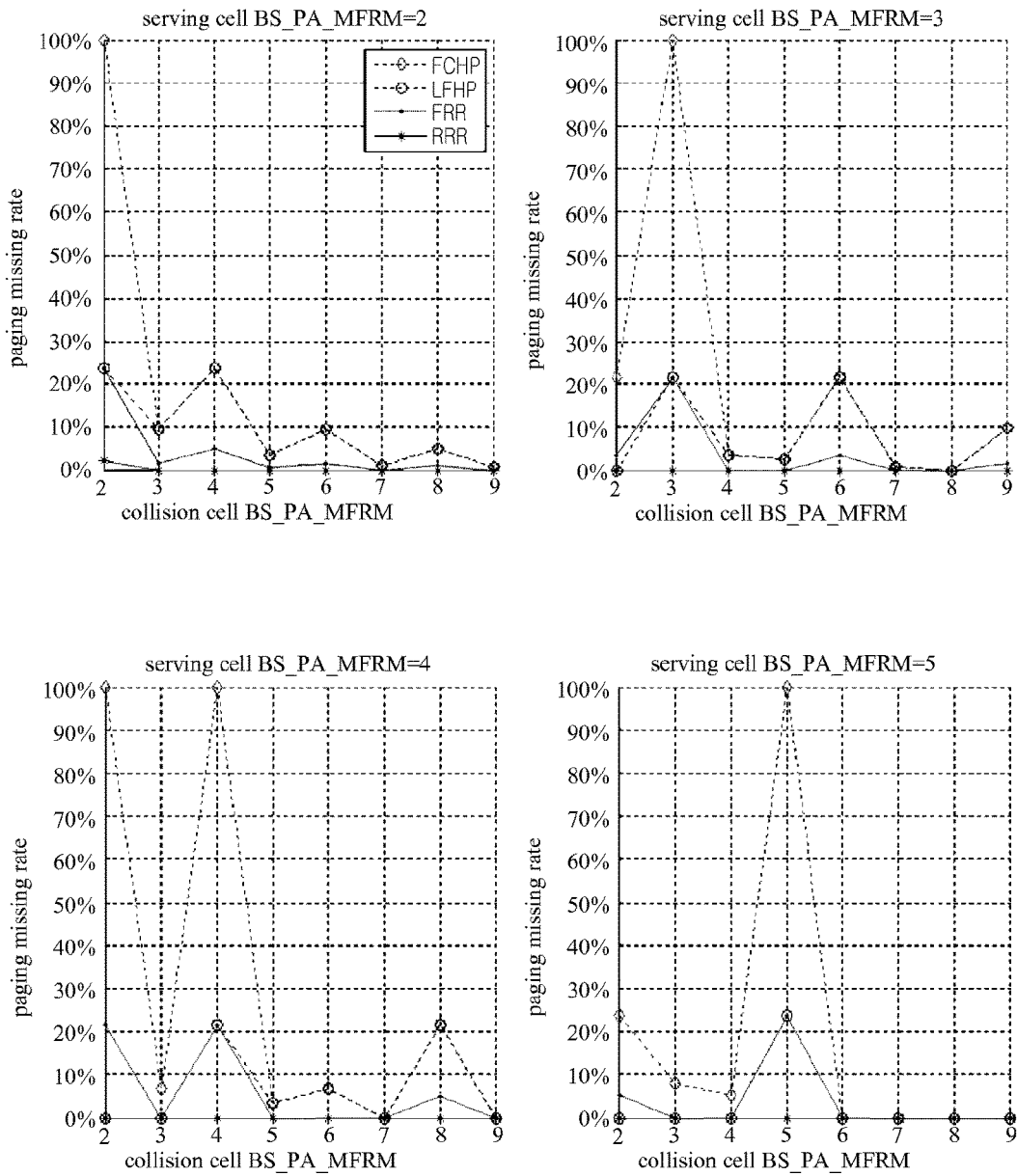
FIGS. 7A and 7B are diagrams illustrating a comparison between a Fundamentalism Round Robin rule, a First Come Higher Priority rule and a Low Frequency Higher Priority rule of prior art and a random round robin strategy according to an exemplary embodiment of the present disclosure.
Figure 7B:
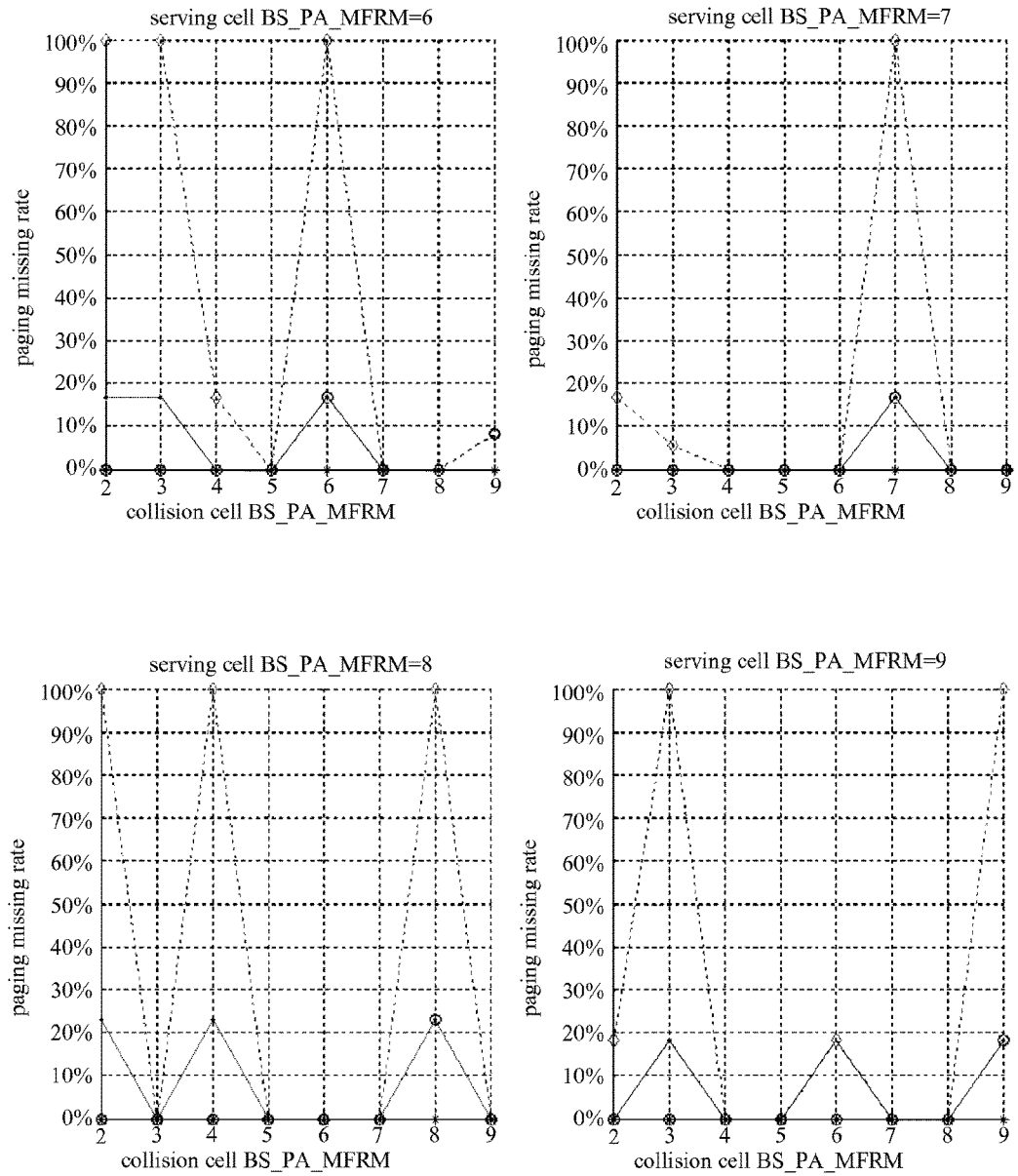

FIGS. 7A and 7B are diagrams illustrating a comparison between a Fundamentalism Round Robin rule, a First Come Higher Priority rule and a Low Frequency Higher Priority rule of prior art and a random round robin strategy according to an embodiment of the present disclosure.

Referring to FIGS. 7A and 7B, "*" line indicates a paging missing rate of the random round robin strategy (RRR). It can be seen from FIGS. 7A and 7B that the paging missing rate of the random round robin strategy (RRR) is significantly lower than the paging missing rates of the Fundamentalism Round Robin (FRR) rule, the First Come Higher Priority (FCHP) rule and the Low Frequency Higher Priority (LFHP) rule, and thus a call setup success rate may be effectively improved.

The paging collision resolution method for the dual SIM card terminal according to the embodiment of the present disclosure can also be embodied as computer readable codes on a non-transitory computer readable recording medium. The computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer-readable code is stored and executed in a distributed fashion. Also, functional programs, codes and code segments to accomplish the paging collision resolution method for the dual SIM card terminal according to the embodiment of the present disclosure can be easily constructed by programmer.

Although some embodiments have been shown and described, it will be understood by those skilled in the art that modifications can be made to these embodiments without departing from the principles and the spirit of the present disclosure, the scope of which is defined by the claims and their equivalents.

What is claimed is:

1. A paging collision resolution method for a dual SIM card terminal, comprising:
    determining whether a receiving time window of paging channel (PCH) for a first SIM card overlaps a receiving time window of PCH for a second SIM card;
    when it is determined that the receiving time window of PCH for the first SIM card overlaps the receiving time window of PCH for the second SIM card, allocating receiving opportunities for PCH to the first and second SIM cards by performing a random round robin strategy using a predetermined random sequence, and
    judging whether current GPRS/EDGE service is in an activated state, and detecting a Network Mode of Operation (NMO mode) of a GPRS/EDGE network; and
    when it is judged that the GPRS/EDGE service is in the activated state, the Network Mode of Operation is NMO II or NMO III, and paging coordination is in a disable state, or when it is judged that the GPRS/EDGE service is in a deactivated state, determining whether the receiving time window of PCH for the first SIM card overlaps the receiving time window of PCH for the second SIM card; and
    when it is judged that the GPRS/EDGE service is in the activated state and the Network Mode of Operation is NMO I, or when it is judged that the GPRS/EDGE service is in the activated state, the Network Mode of Operation is NMO II or NMO III and paging coordination is in an enable state, performing a collision detection for Packet Timing Control Channel (PTCCH)/Packet Associated Control Channel (PACCH)/T3168 timer;
    when any collision is detected, performing a round robin process on Packet Data Channel (PDCH) and PCH; and
    when a receiving opportunity is allocated to PCH through the round robin process, determining whether the receiving time window of PCH for the first SIM card overlaps the receiving time window of PCH for the second SIM card.

2. The paging collision resolution method of claim 1, further comprising: when the receiving time window of PCH for the first SIM card does not overlap the receiving time window of PCH for the second SIM card, the first and second SIM cards independently receive paging messages.

3. The paging collision resolution method of claim 1, further comprising:
    when no collision is detected, determining whether the receiving time window of PCH for the first SIM card overlaps the receiving time window of PCH for the second SIM card.

4. The paging collision resolution method of claim 1, further comprising:
    when the receiving opportunity is allocated to PDCH through the round robin process, performing a receiving operation on PACCH or PTCCH.

5. The paging collision resolution method of claim 1, wherein when the number of paging messages which are continuously transmitted by a mobile communication operator is N, not more than N−1 paging opportunities are continuously allocated to a same SIM card in the predetermined random sequence.

6. The paging collision resolution method of claim 5, wherein the paging opportunities allocated to a same SIM card in the predetermined random sequence do not have periodicity.

7. The paging collision resolution method of claim 6, wherein a number of the paging opportunities allocated to the first SIM card is equal to a number of the paging opportunities allocated to the second SIM card in the predetermined random sequence.

8. The paging collision resolution method of claim 6, wherein a ratio between the paging opportunities allocated to the first SIM card and those allocated to the second SIM card in the predetermined random sequence is dynamically adjusted in response to one of the first and second SIM cards that is selected as a preferred SIM card.

9. The paging collision resolution method of claim 6, wherein a ratio between the paging opportunities allocated to the first SIM card and those allocated to the second SIM card in the predetermined random sequence is dynamically adjusted according to called frequencies of the first and second SIM cards.

10. The paging collision resolution method of claim 6, wherein a ratio between the paging opportunities allocated to the first SIM card and those allocated to the second SIM card in the predetermined random sequence is dynamically adjusted according to paging patterns of different mobile communication operators.

11. The paging collision resolution method of claim 1, wherein the predetermined random sequence is circularly used, so that the random round robin strategy is performed so as to allocate the receiving opportunities for PCH to the first and second SIM cards.

12. The paging collision resolution method of claim 1, wherein a length L of the predetermined random sequence is determined according to the following equation:

$$L=[\text{time length of call paging}/(BS\_PA\_MFRMS*\text{transmission time of multi-frames})]+X,$$

in which BS_PA_MFRMS is paging intervals and X is a positive integer.

13. The paging collision resolution method of claim 1, wherein the allocating the receiving opportunities for PCH to the first and second SIM cards by performing the random round robin strategy using the predetermined random sequence comprises:
    checking whether the first and second SIM cards have PCH in a current multiframe based on a current multiframe number;
    when the first and second SIM cards have PCH in the current multiframe, checking whether the first and second SIM cards have a receiving task for PCH in a current TDMA frame and subsequent N−1 TDMA frames, wherein N TDMA frames form one receiving cycle for PCH; and
    when the first and second SIM cards have the receiving task for PCH in the current TDMA frame or the subsequent N−1 TDMA frames, allocating the receiving opportunities for PCH to the first SIM card or the second SIM card by using the predetermined random sequence.

14. The paging collision resolution method of claim 13, further comprising:
    checking whether a task of which a priority is the same as or higher than a priority of the receiving task for PCH exists in the current TDMA frame based on a current TDMA frame number with respect to the first SIM card;
    if, with respect to the first SIM card, the task of which the priority is higher than the priority of the receiving task for PCH exists in the current TDMA frame, or the task of which the priority is the same as the priority of the receiving task for PCH and which has been in a scheduled state exists in the current TDMA frame, ignoring the receiving task for PCH;
    if the task of which the priority is the same as or higher than the priority of the receiving task for PCH does not exist in the current TDMA frame, checking whether a task of which the priority is higher than the priority of the receiving task for PCH exists in the subsequent N−1 TDMA frames based on the current TDMA frame number with respect to the first SIM card;
    if the task of which the priority is higher than the priority of the receiving task for PCH exists in the subsequent N−1 TDMA frames, ignoring the receiving task for PCH; and
    if the task of which the priority is higher than the priority of the receiving task for PCH does not exist in the subsequent N−1 TDMA frames, performing the checking whether the first and second SIM cards have a receiving task for PCH in the current TDMA frame.

15. The paging collision resolution method of claim 14, wherein the allocating the receiving opportunities for PCH to the first and second SIM cards by performing the random round robin strategy using the predetermined random sequence further comprises:
    when the receiving opportunity for PCH is allocated to the first SIM card by using the predetermined random sequence, in a TDMA frame which is located at a position of paging group in the current multiframe, scheduling underlying resources for the first SIM card, so that the first SIM card receives paging message;
    when the receiving opportunity for PCH is allocated to the second SIM card by using the predetermined random sequence, stopping the scheduling of the underlying resources for the first SIM card;
    checking whether a task of which a priority is the same as or higher than the priority of the receiving task for PCH exists in the current TDMA frame based on the current TDMA frame number with respect to the second SIM card;
    if the task of which the priority is higher than the priority of the receiving task for PCH exists in the current TDMA frame, or the task of which the priority is the same as the priority of the receiving task for PCH and which has been in a scheduled state exists in the current TDMA frame, ignoring the receiving task for PCH;
    if the task of which the priority is the same as or higher than the priority of the receiving task for PCH does not exist in the current TDMA frame, checking whether a task of which the priority is higher than the priority of the receiving task for PCH exists in the subsequent N−1 TDMA frames based on the current TDMA frame number with respect to the second SIM card;
    if the task of which the priority is higher than the priority of the receiving task for PCH exists in the subsequent N−1 TDMA frames, ignoring the receiving task for PCH; and
    if the task of which the priority is higher than the priority of the receiving task for PCH does not exist in the subsequent N−1 TDMA frames, in the TDMA frame which is located at the position of paging group in the current multiframe, scheduling the underlying resources for the second SIM card, so that the second SIM card receives the paging message.

16. The paging collision resolution method of claim 13, wherein when the first SIM card does not have PCH in the current multiframe, the second SIM card independently receives the paging message, and when the second SIM card does not have PCH in the current multiframe, the first SIM card independently receives the paging message; and
    when the first SIM card does not have the receiving task for PCH in the current TDMA frame or the subsequent N−1 TDMA frames, the second SIM card independently receives the paging message, and when the second SIM card does not have the receiving task for PCH in the current TDMA frame or the subsequent N−1 TDMA frames, the first SIM card independently receives the paging message.

17. A dual SIM card terminal, comprising:
    a storage, which stores a predetermined random sequence and program codes of a paging collision resolution method; and
    at least one processor, which is configured to read and execute the program codes stored in the storage, so as to perform the following operations:
    determining whether a receiving time window of paging channel (PCH) for a first SIM card overlaps a receiving time window of PCH for a second SIM card; and
    when it is determined that the receiving time window of PCH for the first SIM card overlaps the receiving time window of PCH for the second SIM card, allocating receiving opportunities for PCH to the first and second SIM cards by performing random round robin strategy using a predetermined random sequence;
    judging whether current GPRS/EDGE service is in an activated state, and detecting a Network Mode of Operation (NMO mode) of a GPRS/EDGE network; and
    when it is judged that the GPRS/EDGE service is in the activated state, the Network Mode of Operation is NMO II or NMO III, and paging coordination is in a disable state, or when it is judged that the GPRS/EDGE service is in a deactivated state, determining whether the receiving time window of PCH for the first SIM card overlaps the receiving time window of PCH for the second SIM card; and when it is judged that the GPRS/EDGE service is in the activated state and the Network Mode of Operation is NMO I, or when it is judged that the GPRS/EDGE service is in the activated state, the Network Mode of Operation is NMO II or NMO III and paging coordination is in an enable state, performing a collision detection for Packet Timing Control Channel (PTCCH)/Packet Associated Control Channel (PACCH)/T3168 timer;

when any collision is detected, performing a round robin process on Packet Data Channel (PDCH) and PCH; and when a receiving opportunity is allocated to PCH through the round robin process, determining whether the receiving time window of PCH for the first SIM card overlaps the receiving time window of PCH for the second SIM card.

18. The dual SIM card terminal of claim 17, wherein, when a current position of the predetermined random sequence indicates that current receiving authority belongs to the first SIM card, the at least one processor is configured to discard a request for paging receiving of the second SIM card, and when a current position of the predetermined random sequence indicates that current receiving authority belongs to the second SIM card, the at least one processor is configured to discard a request for paging receiving of the first SIM card.

19. A paging collision resolution method for a dual SIM card terminal comprising:

determining whether a receiving time window of a paging channel (PCH) for a first SIM card overlaps a receiving time window of a PCH for a second SIM card; and when it is determined that the receiving time window of a PCH for the first SIM card overlaps the receiving time window of a PCH for the second SIM card, allocating receiving priorities for PCH to the first and second SIM cards by performing random round robin strategy using a predetermined random sequence in which when a current position of the predetermined random sequence indicates that current receiving authority belongs to the first SIM card, a request for paging receiving of the second SIM card is discarded, and when a current position of the predetermined random sequence indicates that current receiving authority belongs to the second SIM card, a request for paging receiving of the first SIM card is discarded;

judging whether current GPRS/EDGE service is in an activated state, and detecting a Network Mode of Operation (NMO mode) of a GPRS/EDGE network; and when it is judged that the GPRS/EDGE service is in the activated state, the Network Mode of Operation is NMO II or NMO III, and paging coordination is in a disable state, or when it is judged that the GPRS/EDGE service is in a deactivated state, determining whether the receiving time window of PCH for the first SIM card overlaps the receiving time window of PCH for the second SIM card; and when it is judged that the GPRS/EDGE service is in the activated state and the Network Mode of Operation is NMO I, or when it is judged that the GPRS/EDGE service is in the activated state, the Network Mode of Operation is NMO II or NMO III and paging coordination is in an enable state, performing a collision detection for Packet Timing Control Channel (PTCCH)/Packet Associated Control Channel (PACCH)/T3168 timer;

when any collision is detected, performing a round robin process on Packet Data Channel (PDCH) and PCH; and when a receiving opportunity is allocated to PCH through the round robin process, determining whether the receiving time window of PCH for the first SIM card overlaps the receiving time window of PCH for the second SIM card.

20. The paging collision resolution method according to claim 19, further comprising:

updating a next position of the predetermined random sequence as the current position of the predetermined random sequence;

re-performing the paging collision resolution method in a next paging cycle.

* * * * *